F. W. KUPKE.
CHUCK.
APPLICATION FILED JUNE 28, 1920.
1,384,020.
Patented July 5, 1921.
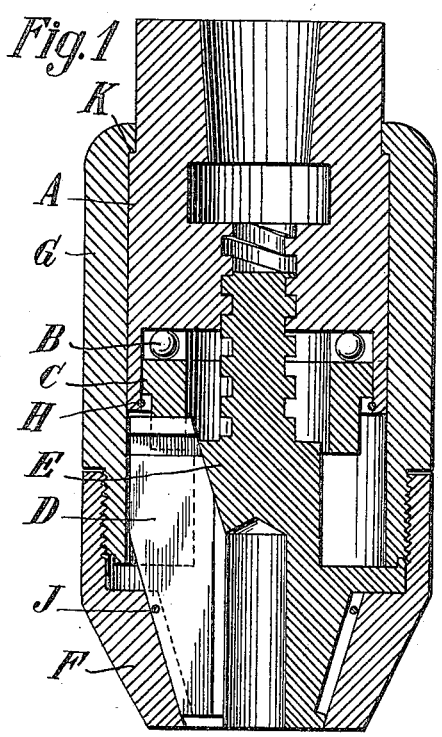
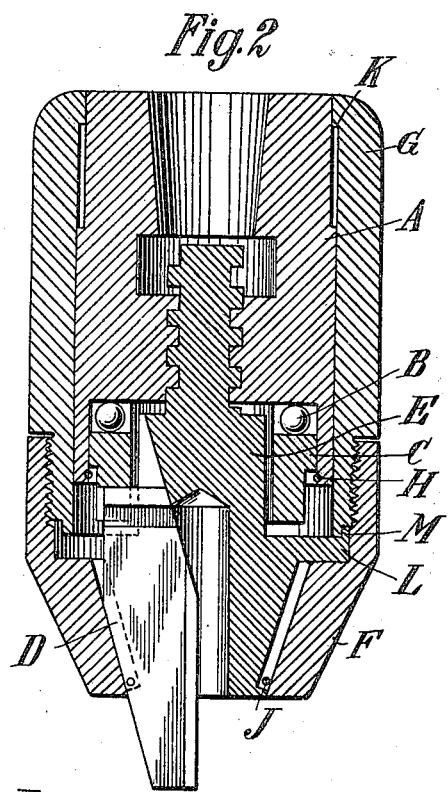
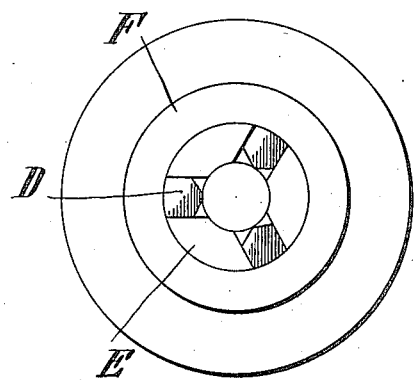
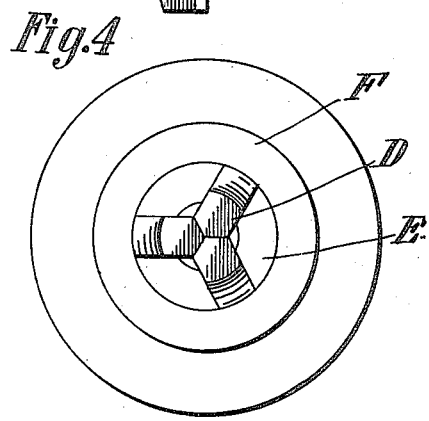
Inventor.
Friedrich Wilhelm Kupke,
By
Atty.

UNITED STATES PATENT OFFICE.

FRIEDRICH WILHELM KUPKE, OF GERA, REUSS, GERMANY.

CHUCK.

1,384,020.   Specification of Letters Patent.   Patented July 5, 1921.

Application filed June 28, 1920. Serial No. 392,422.

*To all whom it may concern:*

Be it known that I, FRIEDRICH WILHELM KUPKE, a citizen of the Republic of Germany, residing at 21 Fröbelstrasse, Gera, Reuss, Germany, have invented new and useful Improvements in Chucks, for which I have filed an application in Germany June 18, 1919, of which the following is a specification.

The present invention relates to a self-acting chuck for a drilling machine, which might be constructed as a frusto-conical chuck, having a threaded spindle, that screws into the body portion of the chuck.

In known chucks of this type generally the disadvantage is encountered that a change of the gripping tension or force will be followed by a change of the total length of the chuck. Besides, these chucks show the further drawback in the event of the drill being inserted in the jaw guide, that the working pressure tending to shorten the length of the chuck, will lead to a loosening of the tool. If, on the other hand the drill is introduced into the head of the threaded spindle proper, difficulties will arise in respect to positively guiding the jaws.

The present invention obviates these drawbacks by guiding the gripping jaws horizontally by the body of the chuck and inclined by the head of the threaded spindle adapted for the reception of the drill or the like. Thus it is possible to guide the gripping jaws positively by pairs of elements and to obviate a change in the length of the chuck, when the force of the tension changes; as well as to make use of the features, which have proven efficient so far in known chucks.

In the drawing a mode of construction of the chuck is shown in longitudinal section, viz. in Figure 1 with jaws open, and Fig. 2 with the jaws entirely closed.

Figs. 3 and 4 are bottom plan views of the chuck.

The chuck consists of the body portion A to be fixed to the spindle of the drilling machine, into which the jaw carrier C is sunk and held by means of the wire lock H, the jaw carrier resting against one of the ball bearings B. The gripping jaws D engage in horizontal notches of the jaw carrier, said gripping jaws being held in position by the inclined recesses in the jaw guide E, which toward its upper end forms the threaded spindle.

The gripping jaws D are held together by the socket F which rests against the jaw guide E, and is screwed up tightly with the guiding ring G surrounding the body portion of the chuck. The ring G has an annular recess at the end of its threading to receive an overhanging rim M of the flange L of the guide jaw E, and such rim is held in said recess by the socket F which is screw-threadedly connected with the threaded portion of the ring G. By this means the jaw guide E is maintained in its original form and changes in the jaw guide slots are prevented. The shifting of the guiding ring in respect to the body of the chuck is limited on the one hand by a stop K and on the other hand by the jaws abutting against each other when closing the chuck. The jaws D are held together by a wire ring J passing through them. This ring lies within a recess in the lower conical portion of the jaw guide E.

The function of the device shown is as follows:

The drill inserted in the bore of the jaw guide E is prevented from becoming dislodged, by turning the guiding ring G by hand. This is effected in such a manner, that the threaded spindle of the jaw guide E is screwed into the body A of the chuck, owing to which the guiding ring G, the socket F and the jaw guide E are moved upward along the body of the chuck. The gripping jaws, however, maintain their unchanged distance from the body A of the chuck or the drilling machine spindle, respectively. After provisionally clamping the drill by hand, working with the tool may be commenced.

During the operation, the resistance of the drill exerts a further thrust through the gripping jaws D upon the jaw guide E and in consequence a further screwing of the thread into the body A of the chuck and tightening of the drill takes place. On the other side loosening of the drill is effected by hand by rotary movement of the guiding ring G in a reverse sense.

What I claim is:

1. In a shelf-acting chuck the combination of a threaded spindle screwing into the body-portion of the chuck, with gripping jaws and means for guiding the jaws horizontally by the body of the chuck and inclined by the head of the threaded spindle.

2. In a self-acting chuck the combination of a threaded spindle screwing into the body-portion of the chuck, with gripping jaws held by a jaw carrier rotatably mounted on the body-portion and means for guiding the jaws horizontally by the body of the chuck and inclined by the head of the threaded spindle.

3. In a self-acting chuck the combination of a threaded spindle screwing into the body-portion of the chuck, with gripping jaws held by a jaw carrier sunk into the body portion and resting against a ball bearing and means for guiding the jaws horizontally by the body of the chuck and inclined by the head of the threaded spindle.

4. In a self-acting chuck the combination of a threaded spindle screwing into the body-portion of the chuck, with gripping jaws guided horizontally by a jaw carrier rotatably mounted on the body portion and means for guiding the jaws inclined by the head of the threaded spindle.

5. In a self-acting chuck the combination of a threaded spindle screwing into the body-portion of the chuck, with gripping jaws guided horizontally by a jaw carrier rotatably mounted on the body portion and slots in the head of the threaded spindle for obliquely guiding the jaws.

6. In a self-acting chuck the combination of a threaded spindle screwing into the body-portion of the chuck, with gripping jaws guided horizontally by a jaw carrier rotatably mounted on the body portion and slots in the head of the threaded spindle for obliquely guiding the jaws held together by a socket which rests against jaw guide and is screwed up tightly with a guiding ring surrounding the body portion of the chuck.

7. In a self-acting chuck, the combination of a body portion, a slotted jaw guide having a threaded spindle engaging said body portion and a ring on said body portion; with gripping jaws guided in the slots of said guide, a socket screw-threadedly connected to said ring, and a flange on the jaw guide held between said ring and socket.

8. In a self-acting chuck, the combination of a body portion, a slotted jaw guide having a threaded spindle engaging said body portion, and a ring on said body portion having a recess at its end; with gripping jaws guided in the slots of said guide, a socket screw-threadedly connected to said ring, and a flange on the guide having a rim seating in the recess on said ring and held therein by said socket.

In testimony whereof I have signed my name in the presence of two witnesses.

FRIEDRICH WILHELM KUPKE.

Witnesses:
ALBERT STRICKERT,
RICHARD BÜCHNER.